United States Patent Office 3,429,932
Patented Feb. 25, 1969

3,429,932
METHOD FOR MAKING HALOGENATED BIS(PHENYLTHIO)BENZENES
Elizabeth G. Horvath, Bartlesville, Okla., assignor to Phillips Petroleum Company, a corporation of Delaware
No Drawing. Filed Jan. 5, 1966, Ser. No. 518,770
U.S. Cl. 260—609          7 Claims
Int. Cl. C07c 149/34

ABSTRACT OF THE DISCLOSURE

Halogenated bis(phenylthio)benzenes are formed by contacting at least one polyhalobenzene with at least one alkali metal sulfide in the presence of a polar organic solvent at an elevated temperature that does not exceed 115° C.

---

This invention relates to a method for making halogenated aromatic sulfides.

Heretofore certain halogenated aromatic compounds have been reacted with another compound to produce polymeric products.

Quite surprisingly, it has now been found that halogenated bis(phenylthio)benzenes are formed when at least one polyhalobenzene is contacted with at least one alkali metal sulfide in the presence of a polar organic solvent for both reactants and at an elevated temperature that does not exceed 115° C.

Accordingly, it is an object of this invention to provide a new and improved method for making halogenated aromatic sulfides.

Other aspects, objects, and the several advantages of this invention will be apparent to those skilled in the art from the description and appended claims.

According to this invention halogenated bis(phenylthio) benzenes having the formula

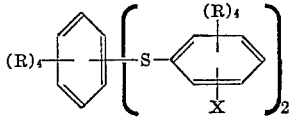

are produced by reacting at least one polyhalobenzene having the formula

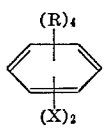

with at least one alkali metal sulfide in at least one polar organic compound which is a solvent for all the reactants. In both the above formulas X is at least one member selected from the group consisting of chlorine and bromine, and R is at least one member selected from the group consisting of X, hydrogen, methyl, and ethyl.

Of the polyhalobenzenes employed in this invention, some, e.g. hexachlorobenzene, are available commercially, and all can be synthesized by one skilled in the art using known methods such as halogenating benzene or an alkyl-substituted benzene under halogenation conditions. Suitable polyhalobenzenes that can be employed include 1,2-dichlorobenzene, 1,3-dibromobenzene, 1,4-dichlorobenzene, 1,3,5-trichlorobenzene, 1,2-dichloro-4,5-dibromobenzene, hexachlorobenzene, hexabromobenzene, 2,4-dichlorotoluene, 2-ethyl-1,3-dibromobenzene, 4-ethyl-2,6-dichlorotoluene, 2,4,6-tribromomesitylene, 1,2,4,5-tetramethyl-3,6-dibromobenzene, 1,2,3,5-tetraethyl-4,6-dichlorobenzene, and the like.

The alkali metal sulfides which can be employed include sulfides of lithium, sodium, potassium, rubidium, and cesium, including the anhydrous and hydrated forms of these sulfides, sodium sulfide being presently preferred.

The polar organic compounds employed should be solvents for both the polyhalobenzenes and the alkali metal sulfides, should be substantially inert to the reactants as well as to the products thereof, and should be substantially liquid at the reaction temperatures and pressures employed. Presently preferred solvents include cyclic and acyclic amides having from 3 to 10 carbon atoms per molecule, inclusive, and cyclic and acyclic sulfones having from 2 to 10 carbon atoms per molecule, inclusive. Examples of such compounds include dimethylformamide, hexamethylphosphoramide, tetramethylurea, N,N′-ethylene dipyrrolidone, N-methyl-2-pyrrolidone, pyrrolidone, caprolactam, dimethylacetamide, sulfolane, dimethyl sulfone, diethyl sulfone, methyl isopropyl sulfone, 3-methylsulfolane, 2,4-dimethylsulfolane, 2-methyl-4-ethylsulfolane, 2,4-diisopropylsulfolane, and the like, including low molecular weight polyamides. The amount of solvent employed can vary widely depending upon the reactants and conditions of reaction but will generally range from about 100 to about 2500 milliliters per mole of alkali metal sulfide employed. Mixtures of these solvents can be employed.

The reaction temperature can vary considerably but should not exceed 115° C. because at high temperatures polymerization to products of high molecular weight tends to occur. Generally, the reaction temperature will be in the range of from about 20 to about 115, preferably from about 60 to about 110° C. The reaction pressures will vary widely but will generally be sufficient to keep the solvent and polyhalobenzene substantially in a liquid phase at the reaction temperatures. The reaction time can also vary widely but will generally be in the range of from about 5 minutes to about 24 hours, preferably from about 30 minutes to about 8 hours. Molar ratios of polyhalobenzene to alkali metal sulfide can vary but will generally be in the range of from about 0.5/1 to about 3/1, preferably from about 1/1 to about 2/1.

The products of the invention can be separated from the reaction mixture by conventional techniques such as distillation, filtration, extraction, crystallization, precipitation, and the like. Although not necessary, inert atmospheres can be employed during the reaction of this invention, such atmospheres including nitrogen, helium, and similar known inert materials.

EXAMPLE

A mixture of 150 ml. of N-methyl-2-pyrrolidone and 24.0 g. (0.10 mole) of sodium sulfide nonahydrate was subjected to azeotropic distillation to remove water of hydration from the sodium sulfide. The residual solution (about 100 ml.) of sodium sulfide in N-methyl-2-pyrrolidone was heated with 28.5 g. (0.10 mole) of hexachlorobenzene at 100° C. for about 5 hours in a nitrogen atmosphere. Water was then added, and from the resulting mixture a solid product was filtered which, after washing with acetone, weighed 14 g. Elemental analysis of the washed solid product indicated it to be bis(pentachlorophenylthio)tetrachlorobenzene ($C_{18}Cl_{14}S_2$).

*Analysis.*—Calculated for $C_{18}Cl_{14}S_2$: C, 27.8; Cl, 64.0; S, 8.24. Found: C, 28.0; Cl, 62.2; S, 8.29.

Reasonable variations and modifications are possible within the scope of this disclosure without departing from the spirit and scope thereof.

I claim:

1. A method for making halogenated bis(phenylthio)-benzene having the formula

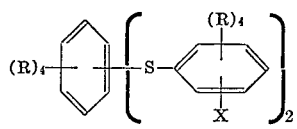

comprising contacting polyhalobenzene having the formula

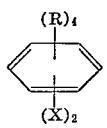

wherein in both formulas X is chlorine or bromine, and R is X, hydrogen, methyl, or ethyl, with alkali metal sulfide at an elevated temperature not exceding 115° C. and in the presence of polar organic compound which is a solvent for the reactants, which is substantially inert to the reactants and the products thereof and which is cyclic or acyclic amides having from 3 to 10 carbon atoms per molecule, inclusive, or cyclic or acyclic sulfones having from 2 to 10 carbon atoms per molecule, inclusive, and mixtures thereof, and the mol ratio of polyhalobenzene to alakali metal sulfide is from about 0.5/1 to about 3/1.

2. The method according to claim 1 wherein the alkali metal sulfides are monosulfides of metals of lithium, sodium, potassium, rubidium, or cesium.

3. The method according to claim 1 wherein the reaction temperature is in the range of from about 20 to about 115° C., the mole ratio of polyhalobenzene to alkali metal sulfide is in the range of from about 1/1 to about 2/1, and the polar organic compound is present in the amount of from about 100 to about 2500 milliliters per mole of alkali metal sulfide present.

4. The method according to claim 1 wherein said polyhalobenzene is hexachlorobenzene, said alkali metal sulfide is sodium sulfide, and said polar organic compound is N-methyl-2-pyrrolidone.

5. The method according to claim 1 wherein said polyhalobenzene is hexabromobenzene, said alkali metal sulfide is potassium sulfide, and said polar organic compound is sulfolane.

6. The method according to claim 1 wherein said polyhalobenzene is hexachlorobenzene, said alkali metal sulfide is lithium sulfide, and said polar organic compound is pyrrolidone.

7. The method according to claim 1 wherein said polyhalobenzene contains no less than two chlorine atoms, wherein said alkali metal sulfide is rubidium sulfide, and wherein said polar organic compound is tetramethylurea.

References Cited

UNITED STATES PATENTS 2,538,941   1/1951   Macallum _____ 260—609 XR
3,322,834   5/1967   Hill et al. _____ 260—609

CHARLES B. PARKER, *Primary Examiner.*

D. R. PHILLIPS, *Assistant Examiner.*